Harold C. Urey
Karl Cohen
Frank T. Barr
Inventors

Nov. 8, 1966 H. C. UREY ETAL 3,284,305
PROCESS OF PRODUCING ENERGY BY NUCLEAR FISSION
Filed June 2, 1947 3 Sheets-Sheet 2

Harold C. Urey
Karl Cohen    Inventors
Frank T. Barr

By Young Attorney

United States Patent Office 3,284,305
Patented Nov. 8, 1966

3,284,305
PROCESS OF PRODUCING ENERGY BY NUCLEAR FISSION
Harold C. Urey, Chicago, Ill., Karl Cohen, New York, N.Y., and Frank T. Barr, Summit, N.J.; said Urey assignor to the United States of America as represented by the United States Atomic Energy Commission and said Cohen and said Barr assignors to Esso Research and Engineering Company, a corporation of Delaware
Filed June 2, 1947, Ser. No. 751,734
1 Claim. (Cl. 176—13)

Figure 1:
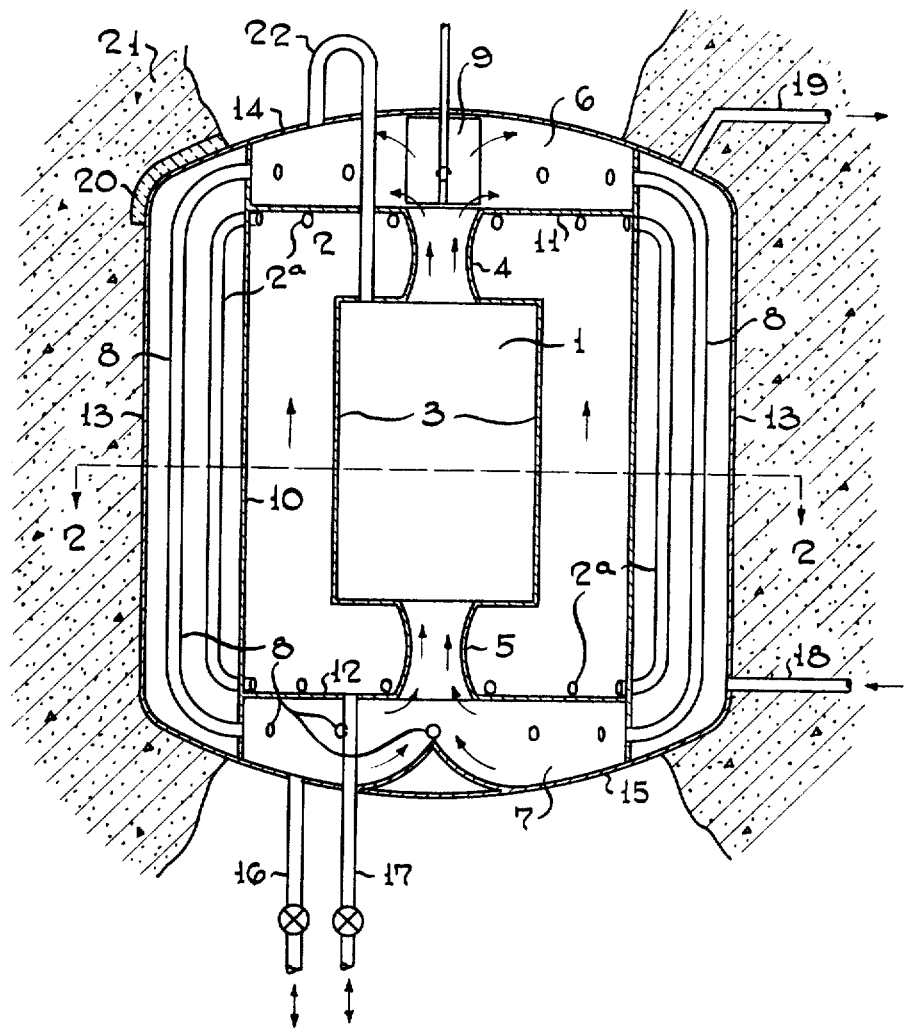
Figure 2:
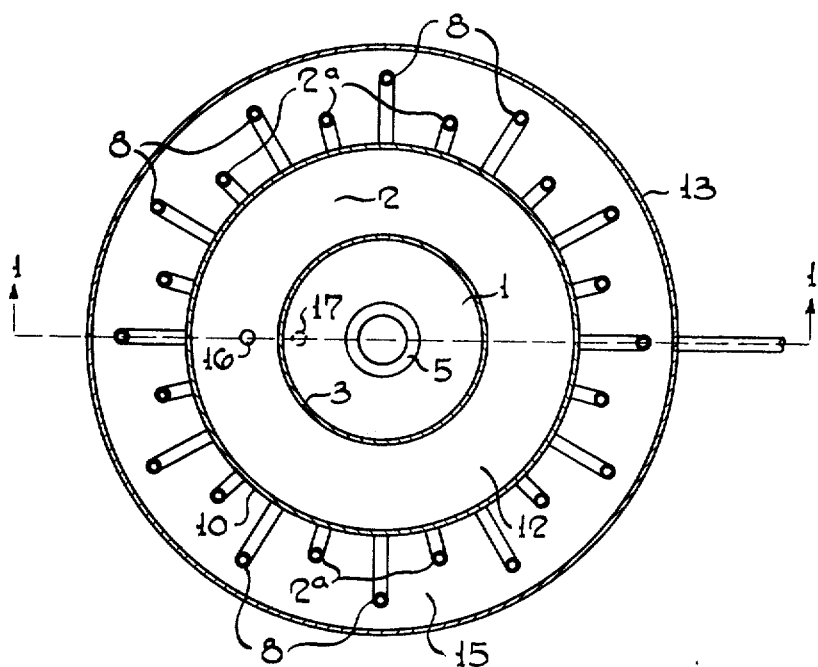
Figure 3:
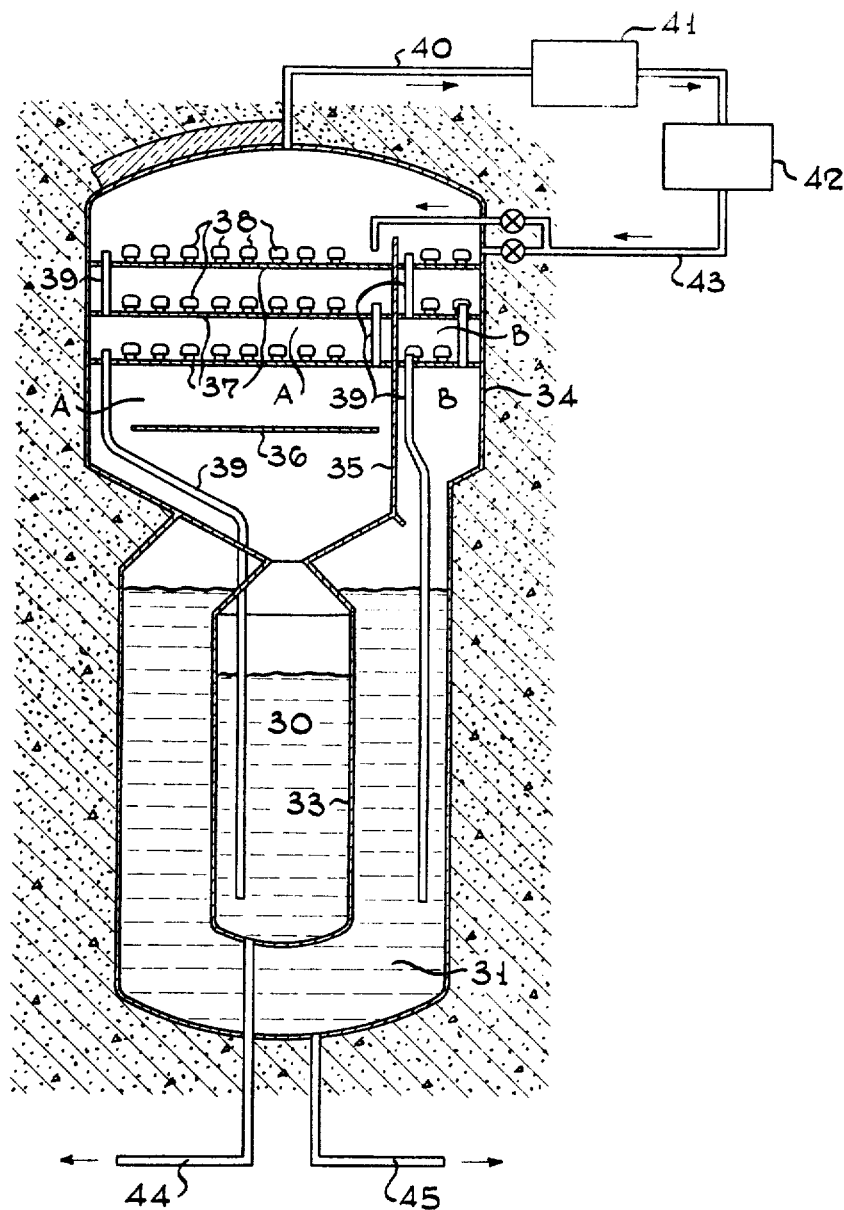

The present invention relates to an improvement method and apparatus for producing energy by nuclear fission and more specifically to an improved method for producing steam and mechanical power by nuclear fission. The invention will be fully understood from the following description and the drawings:

FIG. 1 is a diagrammatic view in sectional elevation of an apparatus for generating heat by nuclear fission, showing the apparatus in which the fission is accomplished, and the means for absorbing the heat for power generation. FIG. 2 is a section of FIG. 1 taken along the line 2—2, showing the arrangement of cooling tubes. FIG. 3 shows a somewhat similar apparatus illustrating a different method for the abstraction of the heat.

In processes of nuclear fission, it is necessary, first, to provide conditions for bringing about the fission itself and for its control and, secondly, for the absorption of the heat or energy for useful purposes. Heretofore most nuclear fission processes have been designed to operate at a low temperature level and most of the heat is wasted because it is released at a low level. In the present case, one of the objects is to devise a process and apparatus capable of operating at a high temperature level for absorbing the heat generated at this high level so as to produce steam and mechanical power. Other objects of the invention will be understood from the following description.

Referring to the drawing, in FIG. 1 numeral 1 denotes the fission chamber which is preferably cylindrically shaped and is centrally located. It is almost completely surrounded by a neutron reflecting and absorption chamber 2. There is a common wall 3 between these two chambers which is lightly constructed, and it should be understood that while this wall provides a fluid tight boundary between the two chambers, it need not be a pressure resisting wall. Furthermore, it is constructed of a material of low neutron absorbing capacity as will be explained below. Circulation conduits 4 and 5 are provided at the upper and lower ends of chamber 1 communicating with upper and lower header spaces 6 and 7, which are also connected by a plurality of heat exchange tubes 8, preferably arranged regularly around the two concentric chambers 1 and 2. The conduits, header spaces and tubes thus provide an exterior circulation path by which the fluid contents of the fission chamber 1 may be withdrawn from the chamber, passed around the external circuit and returned again to the chamber. Circulation may be induced entirely by a thermal means but it is preferable to provide a circulation pump 9 in one of the header spaces.

The absorption and reflecting chamber 2, as stated before, surrounds the fission chamber 1 as completely as possible and it is thus preferably in the form of a cylinder with an annular section. It is provided with circulation tubes 2a from top to bottom similar to tubes 8 of the fission chamber 1 but the surface provided is smaller, since heat generation in the absorption zone is small compared to that in the fission zone. The tube arrangement is shown in section in FIG. 2. The outer wall 10 of chamber 2 is adapted to resist pressure and is located within the circle of the heat exchange tubes 8 and 2a. Upper and lower ends, 11 and 12, of this chamber 2 can conveniently serve as the inner walls of the header spaces 6 and 7 respectively and a steel steam pressure resisting wall 13 encloses the heat exchange tubes, while the ends 14 and 15 complete the external shell and serve as the exterior walls to the header spaces 6 and 7 respectively. Pipes 16 and 17 are provided for the introduction of liquids into chambers 1 and 2 respectively while 18 carries boiler feed water into the external shell and around the heat exchange tubes 8 and 2a by which the boiler feed water is heated and steam is withdrawn by the pipe 19. The outer shell is heat insulated as shown in 20 and surrounded by a heavy concrete radiation-shielding enclosure 21. A pressure balancing line 22 is provided connecting the interior chamber 1 with the interior chamber 2, so that the two will be maintained at the same pressure, without, however, necessarily allowing transfer of material from one to the other.

In FIG. 3 another apparatus adapted to operation in a somewhat different manner is shown, especially with regard to the heat extraction method. The fission zone is indicated by the numeral 30 and the reflecting and absorption zone by 31. This latter zone surrounds 30 and is separated from it by a thin wall 33 which again need not be constructed to withstand heavy pressure. Placed above these two zones is a scrubbing zone 34 which is fitted into two portions marked A and B and again separated by a wall 35. The scrubbing zone is in direct communication with the chambers below, 30 with A and 31 with B, and it is fitted with a splash plate or baffle 36 as well as contact plates 37 thereabove, supplied with bubble cap plates 38 and overflow pipes 39.

Vapors arising from the boiling liquids in chambers 30 and 31 pass upwardly through the two sections A and B of the scrubbing zone. The liquid contents of the two scrubbing zones are kept quite separate by the intervening wall but the vapors arising from the top plate are permitted to mix in the upper portion of the scrubber and the mixed vapor is drawn off by the pipe 40. The steam thus withdrawn may be passed through a catalyst chamber 41 which is illustrated only diagrammatically and therefrom to the power generating unit 42. This properly comprises an expansion engine of any desired type and a condenser and the condensate therefrom is returned by pipe 43 to the scrubbing zone, regulated proportions being admitted to the sections A and B so that the amount of the liquid in the two chambers is maintained in proper ratios and the desired concentrations we mentioned in 30 and 31. Pipes 44 and 45 are provided for introducing liquids into and withdrawing them from the fission and absorption zones respectively.

In the operation of the present process, use is made of a fissionable material, that is to say either the element or compounds thereof, which is capable of absorbing a slow neutron and thereby suffering nuclear fission to produce lower atomic weight products with concomitant generation of excess neutrons and heat. As the fissionable material, normal uranium can be used or uranium enriched in the isotope $U_{235}$ or other active isotopes, but plutonium or mixtures of any of these substances are also used and the uranium isotope 233 is particuralrly contemplated.

Nuclear fission occurs to a practical degree under the influence of slow neutrons of what may be termed the thermal or resonance level and it is therefore necessary to provide moderating materials whose function it is to reduce the speed of the neutrons from the high level at which they are released to a lower level at which absorption is more probable. The fissionable material is preferably dispersed in finely divided form through the moderating material, either in suspension or in a true solution, and it is found that concentrations as low as 0.01% by weight of the fissionable atom are satisfactory and higher concentrations up to 1.00% by weight can be employed, but it is desirable to use the lower range of concentrations. It will be understood, as has been disclosed in the prior art, that the critical fission volume is larger for the lower concentrations of fissionable material. The fissionable material, as stated before, may be present in the metallic state or in a compound such as a chloride, sulfate, nitrate, carbonate, acetate, oxide or the like, but salts having the fissionable atom in the acid radical or anion are also contemplated, such for example as sodium urante or the like.

As the moderating material, heavy water is the most desirable substance and it may be present in the fission zone alone or in both the fission and absorption zones. At low temperatures, for example, on starting up, it may be desirable not to provide heavy water in the absorption zone, which may be just over the critical size, but as the temperature rises heavy water may be added to the absorption zone giving more moderators and thus giving the pile a large range of operating conditions. It is preferable, therefore, to design the pile so that it is not reactive under the normal running conditions without moderators in the absorption zone, but will begin to operate at low temperature without the water in the absorption zone. It is, of course, possible to design the pile so as not to require the moderating effect in the absorption zone under any conditions but generally this will be less economical of the excess neutrons. Critical conditions are not provided in the circulation pipes. In any case, structural materials within the fission and absorption chambers should be of low neutron absorbing quality such as beryllium and the common wall between the reactors is preferably made of this material or of other structural materials such as iron, if used in a sufficiently thin layer to avoid excessive loss of neutrons by absorption.

Nevertheless some neutrons from the zone of fission are lost even when the volume of the reflecting chamber is 3 to 15 times that of the interior chambers and it is desirable to add to the reflecting chamber a material capable of yielding a fissionable product by neutron absorption, thereby increasing the efficiency of neutron utilization greatly, and providing means for making the system self-supporting with respect to fissionable material. By maintaining the concentration of such absorption material at 10 to 100 times greater than that of the fissionable material in the interior zone, the greater proportion of neutrons in excess of those required to maintain fission are absorbed in the absorption chamber and employed to convert the material therein to a fissionable material. As an example of the material that can be used in the absorption vessel, thorium is perhaps the best and it is converted by the action of neutrons to $U_{233}$ which subsequently can be used as the fissionable material itself. Thorium is not the only material that can be used, however, in the absorption vessel and uranium-238 or any other material capable of producing a fissionable material may be used in the absorption vessel. Such materials may be present in the metallic state as oxides or as salts, preferably those containing only the elements deuterium, carbon, oxygen, fluorine or sulfur in the anions; in other words anions such as carbonate, acetate, fluoride, sulfide, sulfate, or hydroxide since these materials do not tend to absorb too large a proportion of the neutrons and they can, in consequence, be largely absorbed by the atom which yields fissionable material.

Heat is withdrawn from the fission chamber in any desired manner and two different methods are shown for illustration in the drawings which have been described heretofore. Thus in the process as shown in FIG. 1, pressure is maintained in the vessels 1 and 2 above the vapor pressure of the liquids contained therein and these pressures are so balanced as to permit the use of a thin wall 3 between the two vessels. As an example of the pressures employed one may use 1000#/sq. in., and a maximum temperature of about 550° F., i.e. as high as possible without vaporizing the fluid under the high pressure prevailing. The moderating material, for example $D_2O$, is thus kept as a liquid in the two zones and circulates through the heat exchange tubes 8 and 2a from which heat is transmitted to the surrounding boiler feed water and steam at, for instance, about 400 pounds pressure and a saturation temperature of about 450° F., is generated in this way.

In the exemplification of the process shown in FIG. 3, a lower pressure in the pile may be employed, so that the heavy water, deuterium oxide, in the interior chamber boils briskly and produces steam directly at a temperature of about 450° F. and pressure of about 400#/sq. in. In general, however, greater pile capacity and thermal efficiency of utilization of the steam are obtained by using pressures as high as are mechanically feasible. In this case there is no need for heat exchange surface and heat is conducted from the fission chamber as latent heat of evaporation in the heavy water steam produced. This steam may be used as the working medium in the power producing cycle and this is indicated in FIG. 3. It is necessary, however, on account of the high cost of deuterium oxide to carefully recover the condensate and return it to the interior of the vessels. The pressures and temperature given above are to be considered only as examples, thus the apparatus illustrated in FIG. 1 may be employed at any pressure desired, the pressure to be selected so as to maintain the liquids in the fission chamber liquid and to give the desired temperature. Also in FIG. 3 the pressure may be whatever desired and is chosen to give steam of the desired pressure and temperature.

In both of the drawings, pressure balancing means have been shown but it will be understood that other means for balancing pressure between two vessels can be employed, for example, electrical and mechanical instruments.

Under the action of neutrons there is a slow decomposition of the deuterium oxide during this process giving rise to $D_2$ and $O_2$ and these gases may be vented either continuously or at intervals. It is desirable to recombine them for reuse, for example, by using the ordinary combustion or by low temperature combination under the influence of catalysts such as nickel, iron, platinum, cobalt, palladium, tungsten, molybdenum, chromium, or the oxides thereof, and the like. If desired, these catalytic materials may be added directly to the fission and absorption chambers respectively, in order to effect recombination in situ, but the amounts of the catalyst must be quite small, for example, preferably not over 0.1–1.0% of the metal by weight of the solution in order to avoid undesired absorption of neutrons, the exact amount allowable depending on concentration of fissionable material employed, as well as on the specific neutron absorption characteristics of the oxidation catalyst used. Another way of accomplishing the same purpose is illustrated in FIG. 3 where the steam produced and which carries the $D_2$ and $O_2$ covered by the aforesaid description may be passed over a catalyst of the type disclosed above to cause recombination with heat evolution. This results in superheat amounting to 7° F. for each 0.1% by volume of deuterium-oxygen gas mixture occurring in the vaporized $D_2O$. This procedure avoids the necessity of separating these gases.

An important feature of the present invention is the use of fissionable material in a fluid form so that it may be conveniently added from time to time or continuously, or withdrawn for purification to remove fission products which eventually poison the reaction. This is particularly important with respect to the uranium employed but thorium may also be present in solution and may be replaced as desired. It is not so important, however, to replace the thorium continuously because conversion thereof to uranium is atom for atom and poisons are not generated to any great extent. If desired, thorium may be employed in a metallic state or as its oxide or carbonate, acetate and the like in the absorption zone, in the form of lumps, so that when thorium is converted to uranium the latter can be readily dissolved and removed in the solution. Where the salts are used, the uranium salt is much more soluble than those of thorium and if oxide is employed it will be desirable to employ acidified water, such as water acidified with acetic or other weak acid, preferably containing no atoms of high neutron absorbing power.

The present process is very advantageous since the inventory of the fissionable material may be made much lower than any piles which have hitherto been described. Thus the uranium employed directly in the fission zone at any one time may be of the order of 40 to 80 lbs., depending on the specific design and based on the use of pure $U_{235}$, that is to say of 90% purity or better. With normal uranium or uranium which is not enriched to the extent of 90 to 95% with $U_{235}$, the amount undergoing fission will have to be greater and it will be understood that the total inventory will be considerably more than the figures given above since substantial quantities will always be in the process of purification and desensitization. It is understood that the pile may be operated at any desired production limit and the ultimate capacity will undoubtedly be fixed by heat transfer surface provided and the size of the vapor lines. Nevertheless it is contemplated that the equipment will be most efficiently designed for a conversion or fission of 1 to 5% of the $U_{235}$ per day. From one pound of $U_{235}$ which is converted by fission 2,500,000 kwh. of electrical energy is produced, assuming 25% efficiency or in other words 35 billion B.t.u. in the form of heat.

We claim:

A process for producing and utilizing energy, comprising maintaining $D_2O$ and finely divided, enriched uranium in an amount sufficient to sustain a nuclear chain reaction in a fission zone, maintaining a mixture of $D_2O$ and a fertile material in a neutron absorbing zone substantially surrounding said fission zone, separating the effluent from the fission zone into liquid and steam components in a first scrubbing zone and returning the liquid to the fission zone, separating the effluent from the neutron absorbing zone into liquid and steam components in a second scrubbing zone and returning the liquid to the neutron absorbing zone, combining the steam components from the first and second zones, circulating the steam components through a catalytic deuterium-oxygen recombiner, a power generating unit and a condenser, and returning the condensate in selected parts to the fission zone and neutron absorbing zone.

References Cited by the Examiner

UNITED STATES PATENTS

| 2,097,769 | 11/1937 | Mitscherling | 204—193 |
| 2,206,634 | 7/1940 | Fermi et al. | 204—154 |

FOREIGN PATENTS

| 114,150 | 5/1940 | Australia. |
| 114,151 | 5/1940 | Australia. |
| 861,390 | 2/1941 | France. |
| 233,011 | 10/1944 | Switzerland. |

OTHER REFERENCES

Goodman, "The Science and Engineering of Nuclear Power," vol. 1, page 275, Addison-Wesley Press (1947).

Smyth, "Atomic Energy for Military Purposes," pp. 19, 20, 22, 85, and 177, August 1945.

Kelly et al., Physical Review 73, 1135–9 (1948).

REUBEN EPSTEIN, *Primary Examiner.*

SAM COCKERILL, JOHN R. SPECK, JAMES L. BREWRINK, *Examiners.*

H. F. GLASS, *Assistant Examiner.*